United States Patent
Whitman

(10) Patent No.: US 7,563,098 B2
(45) Date of Patent: Jul. 21, 2009

(54) PAINT COLOR SELECTION SYSTEM AND METHOD

(75) Inventor: Kari Whitman, West Hollywood, CA (US)

(73) Assignee: Wall Makeup LLC, West Hollywood, CA (US)

( * ) Notice: Subject to any disclaimer, the term of this patent is extended or adjusted under 35 U.S.C. 154(b) by 540 days.

(21) Appl. No.: 11/485,697

(22) Filed: Jul. 13, 2006

(65) Prior Publication Data
US 2008/0026347 A1    Jan. 31, 2008

(51) Int. Cl.
*G09B 19/00*    (2006.01)

(52) U.S. Cl. ......................................................... 434/98

(58) Field of Classification Search .................. 434/81, 434/84, 85, 98, 103; 283/74, 81, 117; 206/1.7, 206/1.8, 1.9
See application file for complete search history.

(56) References Cited

U.S. PATENT DOCUMENTS

| | | | | |
|---|---|---|---|---|
| 3,628,260 A | * | 12/1971 | Jacobson | 434/103 |
| 3,815,265 A | * | 6/1974 | DePauw | 434/103 |
| 4,992,050 A | * | 2/1991 | Edwards | 434/98 |
| 5,217,377 A | * | 6/1993 | Little, Jr. | 434/103 |
| 5,743,407 A | * | 4/1998 | Williams | 206/575 |
| 6,217,336 B1 | * | 4/2001 | Matthews | 434/84 |
| 6,416,612 B1 | * | 7/2002 | Lerner et al. | 156/277 |
| 6,857,875 B1 | * | 2/2005 | McClure | 434/81 |
| 6,926,527 B2 | * | 8/2005 | Johnson, Jr. | 434/84 |
| 6,994,553 B2 | * | 2/2006 | DaRif et al. | 434/98 |
| 7,005,171 B2 | * | 2/2006 | Lerner et al. | 428/41.8 |
| 2005/0135671 A1 | * | 6/2005 | Levin et al. | 382/162 |
| 2005/0208456 A1 | * | 9/2005 | Swanick | 434/84 |

OTHER PUBLICATIONS

Tim Carter, Ask The Builder, Matching Paint Colors Perfectly, Copyright 1993-2006.

* cited by examiner

*Primary Examiner*—Kurt Fernstrom
(74) *Attorney, Agent, or Firm*—Loza & Loza, LLP; Heidi Eisenhut

(57) ABSTRACT

A self-contained paint color system and method is described comprising a handled carrying box, at least one container of a base color paint, a plurality of containers containing colored tints, and a "matchbook" styled booklet that incorporates coordinated and matching sheets and self-adhesive stickers. When utilizing this paint color selection system and method, a designer can create and select numerous colors utilizing a single kit.

4 Claims, 6 Drawing Sheets

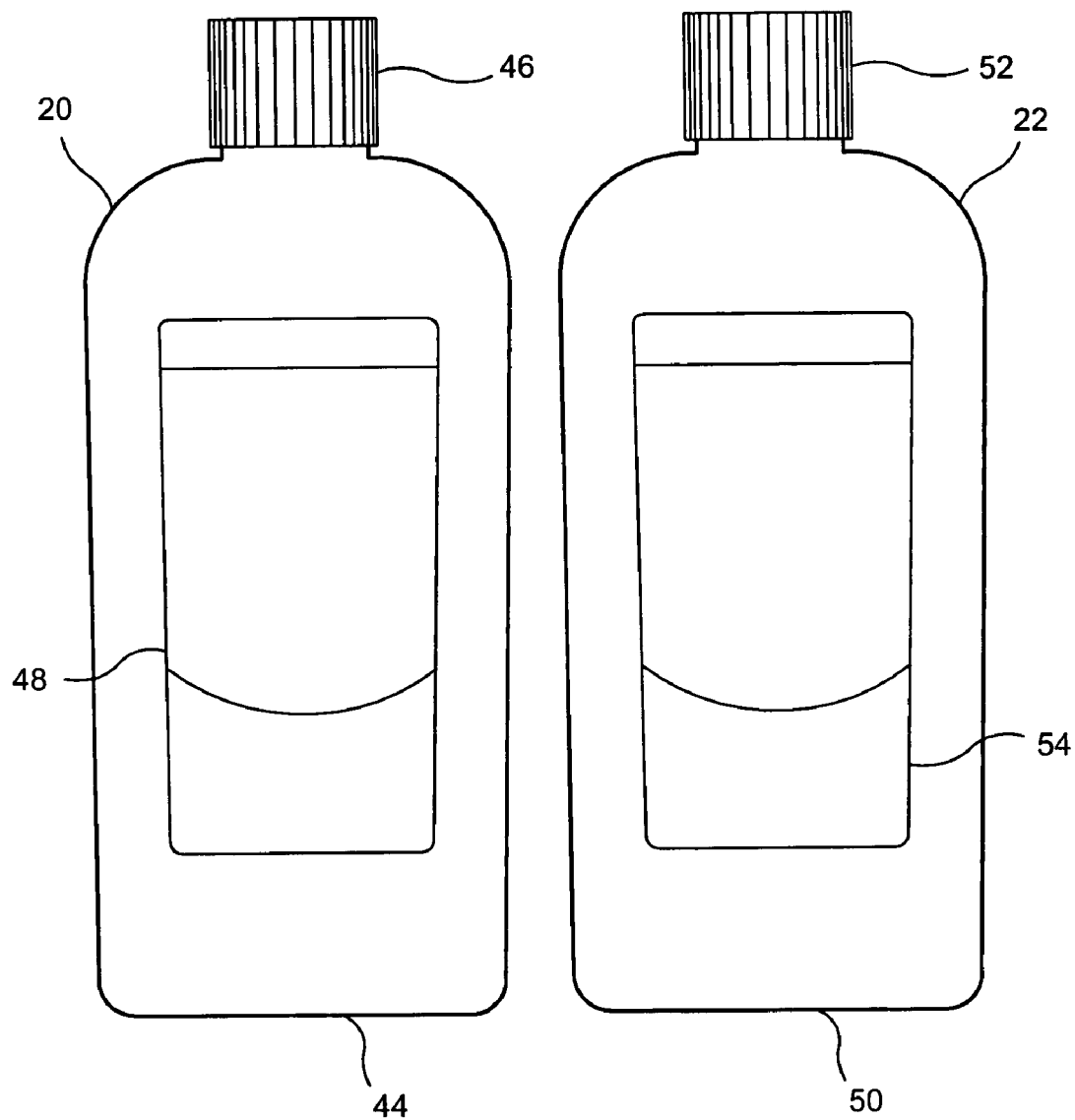
F I G. 2

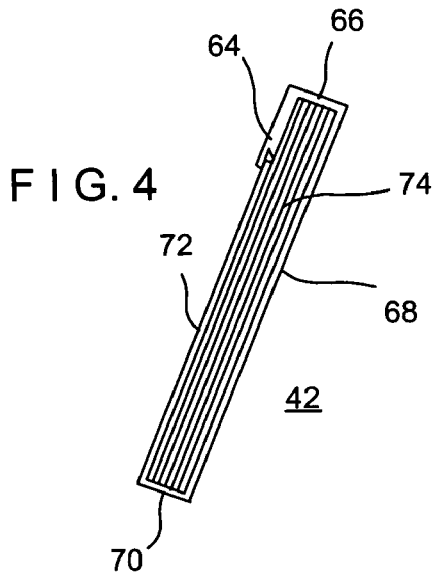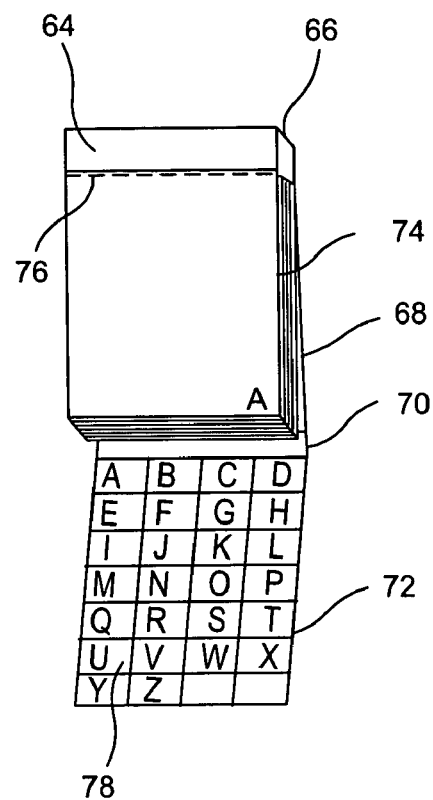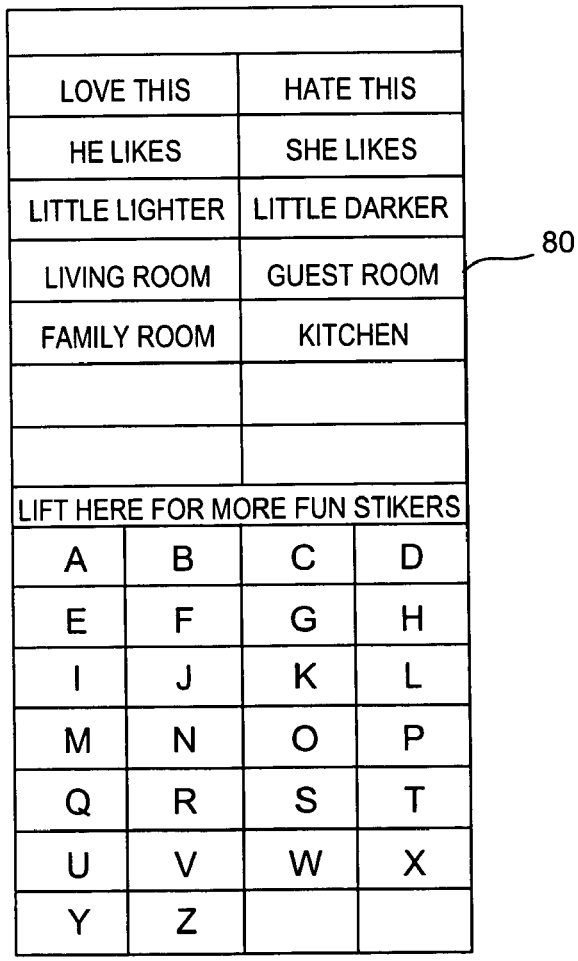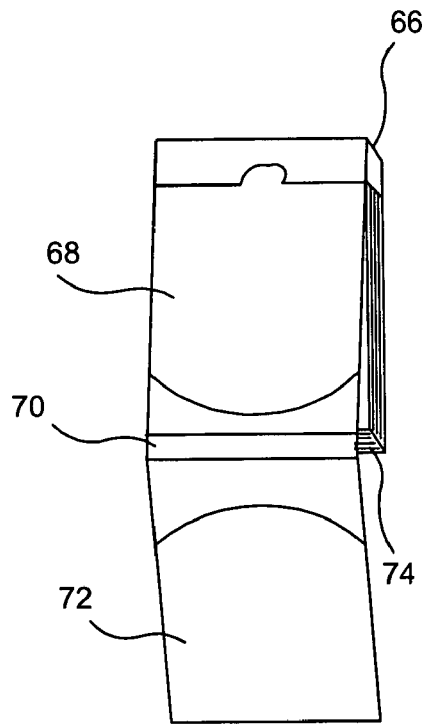
FIG. 4
FIG. 5
FIG. 7
FIG. 6

PAINT COLOR SELECTION SYSTEM AND METHOD

FIELD OF THE INVENTION

This invention is generally directed to a system and method for creating and selecting a desired paint color from a created paint chip to place on a surface such as a wall. More specifically, the system and method of the present invention provides a self-contained kit that includes at least one base paint, a plurality of color tints and a plurality of coded sheets and correspondingly matched coded self-adhesive stickers that allows a user to keep track of desirable color results without resort to any measuring or the creation of any paint mixing formulas. The desired resultant color can then be brought to any retailer that utilizes a computer color matching system to create additional quantities of paint incorporating the desired resultant color.

BACKGROUND OF THE INVENTION

Users, such as designers, decorators, painters, and do-it-yourself homeowners, have been painting surfaces for hundreds of years. While there have been significant advancements in the chemical compositions of paints to increase durability, simplify use, improve application, and reduce toxicity, the most important consideration for most users, particularly in interior locations, is the creation and selection of a desired color. More specifically, users attempt to select paint colors that match or enhance the style and color scheme of a particular room or fit a specific geographic location.

With the development of advanced computer technology, most home improvement retailers and paint supply retailers have well-known computer programs and systems that can match any desired color that a user brings to the retailer. Thus, for instance, if the user wishes to exactly match a color of a particular fabric, the fabric color can be input into the computer system, a paint formulation can be developed to effectively match the color of the selected fabric, and sufficient quantities of that paint can be produced. While the ability to match the color of a particular fabric and the like has provided users with significantly more flexibility in creating and selecting colors for wall paint, undesirable results often occur due to the fact that there is no effective substitute for actually painting a portion of a wall surface, allowing it to dry, and then considering the end result. In order to overcome this shortfall, certain paint manufactures have begun selling paints in smaller, sample-sized quantities. A user would need to go to a retailer, select what appears to be a desired color, paint a small portion of the wall surface, allow the paint to dry, and then conclude whether the paint is desirable. If the dried paint color is undesirable, the user would need to make an additional trip to the retailer to select another sample-sized paint or have another can of white paint to lighten the original color and create a new paint chip. Even if a desired result was achieved, the user would need to return to the retailer to purchase additional quantities of paint. Moreover, if a designer (or homeowner) wishes to see several variations of colors for different walls within a room or for multiple rooms, numerous sample-sized paint containers would need to be purchased. The process is both time-consuming and expensive.

Even when sold in sample-sized quantities, the consumer may not be satisfied with any of the offered pre-mixed colors. Sometimes, users will resort to creating a formula whereby they will add additional measured quantities of white paint to a color slightly darker than the desired result to create a suitable color. Regrettably, this technique requires the purchase of additional paints and replication of the desired formula mix is not always effectively achieved because of confusion as to the desired formula or due to the ineffectiveness of mixing the colors. The result could be a wall surface having slightly different hues.

It should also be noted that when a decorator is remodeling an entire home, the process of creating and selecting a desired resultant color is further complicated due to the necessity of mixing/choosing colors for each room. Multiple sample-sized paint containers and formulations are required. This results in an even greater expenditure of time, effort and money. Additionally, the multitude of paint cans and disposal of unused paints creates undesirable environmental issues.

It is therefore a primary object of the present invention to provide a new and improved system and method for creating and selecting a paint color to be applied to a wall surface.

It is yet another object of the present invention to provide a new and improved system and method for creating and selecting a paint color to be applied to a wall surface that can be easily carried in a self-contained kit, which can be used for multiple surfaces and/or rooms.

It is yet a further object of the present invention to provide a new and improved system and method for creating and selecting a paint color to be applied to a wall surface that can easily be adopted for numerous rooms without additional cost.

It is still a further object of the present invention to provide a new and improved system and method for creating and selecting a paint color to be applied to a wall surface that requires no measurements or created formulations.

It is an additional object of the present invention to provide a new and improved system and method for creating and selecting a paint color to be applied to a wall surface that provides a means to easily keep track of desired and undesirable results.

It is another object of the present invention to provide a new and improved system and method for creating and selecting a paint color to be applied to a wall surface that requires less waste and is thus more environmentally friendly.

Other objects and advantages of the present invention will become apparent from the specification and the drawings.

SUMMARY OF THE INVENTION

Briefly stated and in accordance with the preferred embodiment of the present invention, a self-contained paint color selection system is described having a kit comprising a handled carrying box, at least one container of a base color paint, a plurality of containers containing color tints, and a "match book" style booklet that incorporates coordinated and matching sheets (which are generally white) and self-adhesive stickers. The kit of the preferred embodiment of the present invention may also include a mixing container, a paint mixing stick to effectively combine the base color paint with the color tints within the mixing container, a paint brush, and/or visual instructional media such as a digital video disc or a printed instruction manual. The self-adhesive stickers are easily removable from the booklet and attachable to a wall surface. Similarly, the sheets within the booklet are easily and individually removable to allow a designer to bring the finally selected coded sheet to a paint retailer when desired.

When utilized, a user will use the paint mixing stick to combine desired color tints into the base color paint within the mixing container. If the resultant colored paint appears desirable, the user will utilize the paint brush to paint a small portion of the wall surface and also paint a first coded sheet form the booklet. A user will then remove the matching coded self-adhesive sticker and place it on the wall next to the painted area. After the paint has dried, the user can look on the wall to determine if a desired result was achieved. If a desired result indeed was achieved, the painted sheet can be removed from the booklet and brought to a retailer to manufacture additional quantities of paint. Conversely, if the result is undesirable, the user can repeat the process to obtain a different colored result. This process can be easily repeated until the user is satisfied.

BRIEF DESCRIPTION OF THE DRAWINGS

While the specification concludes with claims particularly pointing out and distinctly claiming the subject matter regarded as the invention herein, it is believed that the present invention will be more readily understood upon consideration of the description, taken in conjunction with the accompanying drawings, wherein:

FIG. 2 is a schematic illustration of the two containers of base color paints incorporated in FIG. 1 removed from the carrying box;

FIG. 4 is a side view of the booklet incorporated in FIG. 1 removed from the carrying box in a closed position;

FIG. 5 is a front view of the booklet incorporated in FIG. 1 removed from the carrying box and in a partially open position, which shows the top one of the plurality of coded sheets and the correspondingly matched plurality of self-adhesive stickers;

FIG. 6 is a back view of the booklet incorporated in FIG. 1 removed from the carrying box and in a partially open position;

FIG. 7 is a front view of the booklet incorporated in FIG. 1 removed from the carrying box wherein the plurality of coded sheets have been removed to show a plurality of descriptive self-adhesive stickers.

DESCRIPTION OF THE PREFERRED EMBODIMENT

Figure 1:
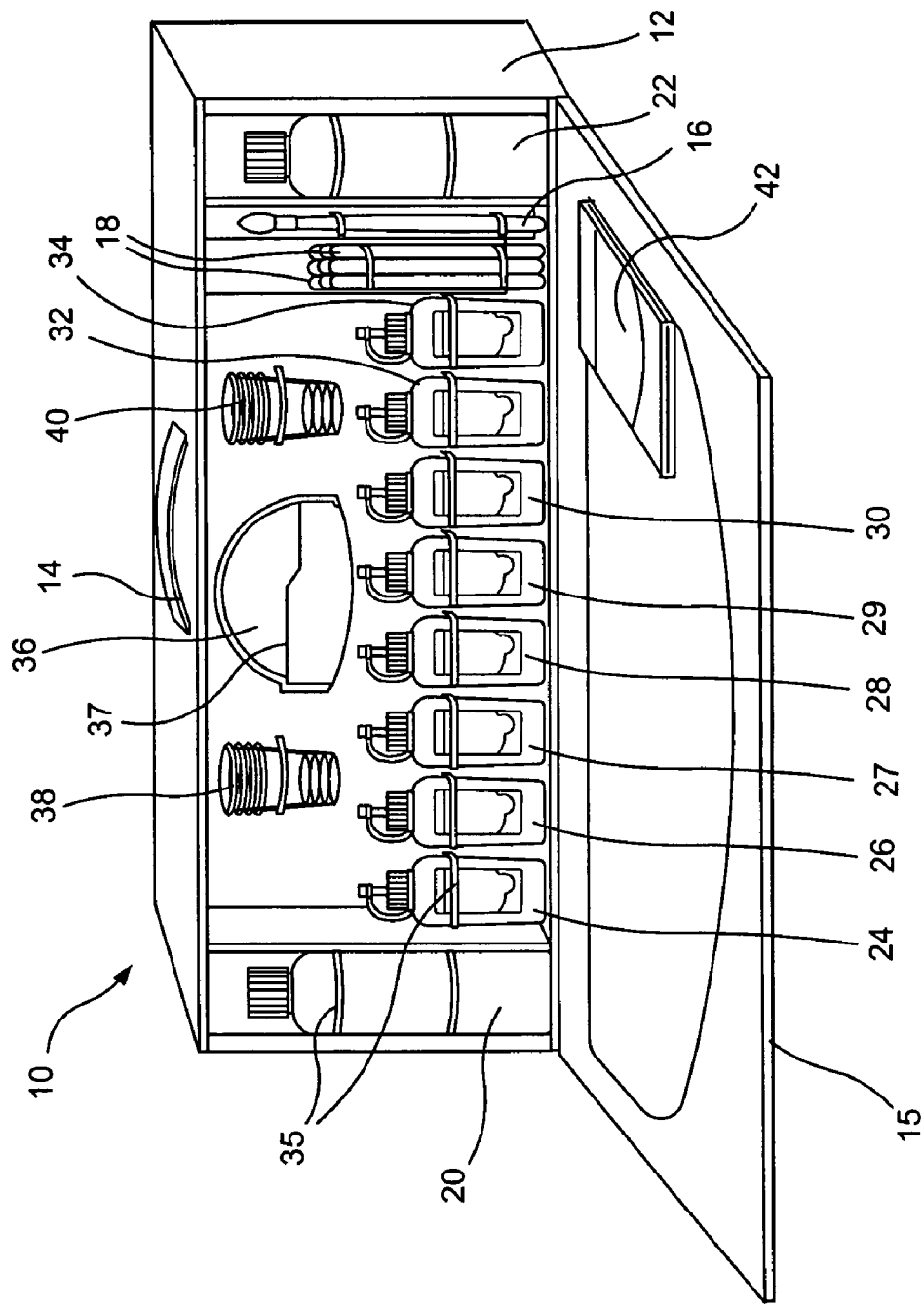
FIG. 1 is a schematic illustration of a self-contained paint color selection system in accordance with the present invention including two base color paint containers, eight color tint containers, a plurality of paint mixing sticks, a paint brush, an instructional video disc, a match book styled booklet comprising a plurality of selectively removable coded sheets and a correspondingly matched plurality of selectively removable coded self-adhesive stickers, and a plurality of mixing containers wherein all components are selectively contained within said carrying box.

Referring first to FIG. 1, a self-contained paint color selection kit generally designated by reference numeral 10 is shown. Kit 10 comprises a carrying box 12 which includes a carrying handle 14. A sealable flap 15 of carrying box 12 is depicted in an open position to show the contents of carrying box 12. Carrying box 12 includes a paint brush 16, a plurality of paint mixing sticks 18, a first base color paint container 20, a second base color paint container 22, and eight color tint containers designated by reference numerals 24, 26, 27, 28, 29, 30, 32, and 34. Paint brush 16, paint mixing sticks 18, base color paint containers 20 and 22, and color tint containers 24, 26, 27, 28, 29, 30, 32 and 34 are selectively secured within carrying box 12 by means of elastic bands 35. It will be readily noted by those skilled in the art that instead of utilizing elastic bands 35, the various elements contained within carrying box 12 can be selectively secured by means of twisted secured wires, cut-outs within the material comprising carrying box 12, glued tabs, or by many other known means. There is also no absolute requirement that the listed elements be secured within carrying box 12; however, it is preferable in order to minimize the risk of breakage.

Carrying box 12 preferably also incorporates an instructional digital video disc 36 that is packaged within a slot 37 of carrying box 12. In alternative and foreseen embodiments, instructional information can instead be provided in a paper format or an instructional website address can be provided. A means for mixing colors in accordance with the present invention can be provided by including mixing containers 38 and 40 in carrying box 12. As depicted in FIG. 1, paint mixing containers 38 and paint mixing containers 40 are conveniently provided in cut-out slots within carrying box 12. However, mixing containers 38 and 40 can alternatively be provided in other sections of carrying box 12. Moreover, although not depicted, carrying box 12 can also contain items such as additional base color paints, gloves, drop cloths, etc.

Additionally, and of significant import to the system and method of the present invention, is the incorporation of a match book styled booklet 42 within carrying box 12. Booklet 42 can preferably be selectively incorporated into carrying box 12 by a series of gummed tabs or by providing an appropriately sized slot in box 12 to engage booklet 42. The utility of booklet 42 will be described in greater detail in connection with the description of FIGS. 4-8.

It should be readily noted that all of the components contained within carrying box 12 can easily and selectively be removed and replaced from carrying box 12. Moreover, although a specific number of items have been depicted, there is no limitation as to how many paint brushes, paint mixing sticks, base color paints, color tints, etc. (or what combinations thereof) can be provided.

Carrying box 12 can be comprised of numerous materials and take countless forms. For instance, carrying box 12 can be comprised of cardboard, wood, plastic, and the like. Moreover, the inside of carrying box 12 can take numerous shapes to contain varying components. Carrying box 12 can also incorporate printed instructional information, marketing data, or recommended paint combinations. While carrying box 12 has been depicted having handle 14, no such item is required. Handle 14, when incorporated, can be comprised of plastic, decorative rope, or any other materials known in the art capable of supporting the contents of carrying box 12.

Paint brush 16 can be of any type known in the art, including paint brushes made of wood, plastic, natural fibers, synthetic fibers, etc. Alternatively, paint brush 16 can be a roller or a paint pad; for purposes of the present application the term "paint brush" will incorporate all such devices. Similarly, although paint mixing sticks 18 have been depicted in FIG. 1 as having a shape similar to a nail file, any elongated shape would be suitable. Paint mixing sticks 18 can be comprised of wood, plastic, or any other suitable material know in the art. Paint mixing containers 38 and 40 can be comprised of plastic, glass, paper, or other suitable materials. Furthermore, paint mixing containers 38 and 40 can either be disposable or reusable. It will also be understood by those skilled in the art that kit 10 can take various forms such as eliminating paint mixing sticks 18 and, instead, replacing paint mixing containers 38 and 40 with containers that include sealable lids to allow the mixed color combinations to be shaken instead of stirred.

FIG. 2 depicts a first base color paint container 20 and second base color paint 20 container 22. As provided for in the preferred embodiment, first base color paint container 20 is comprised of a bottle 44 and a screw-off cap 46. First base color paint container 20 will also typically include a glued label 48 that may incorporate information such as marketing data, color contents, and/or instructional information. As shown in FIG. 2, second base color paint container 22 similarly includes a bottle 50 a screw-off cap 52, and label 54. Both bottle 44 and bottle 50 can be comprised of glass, plastic, or any other suitable material for holding liquids. Bottle 44 and bottle 50 will be filled with certain base paints, which are typically white or beige color schemes.

Figure 3:
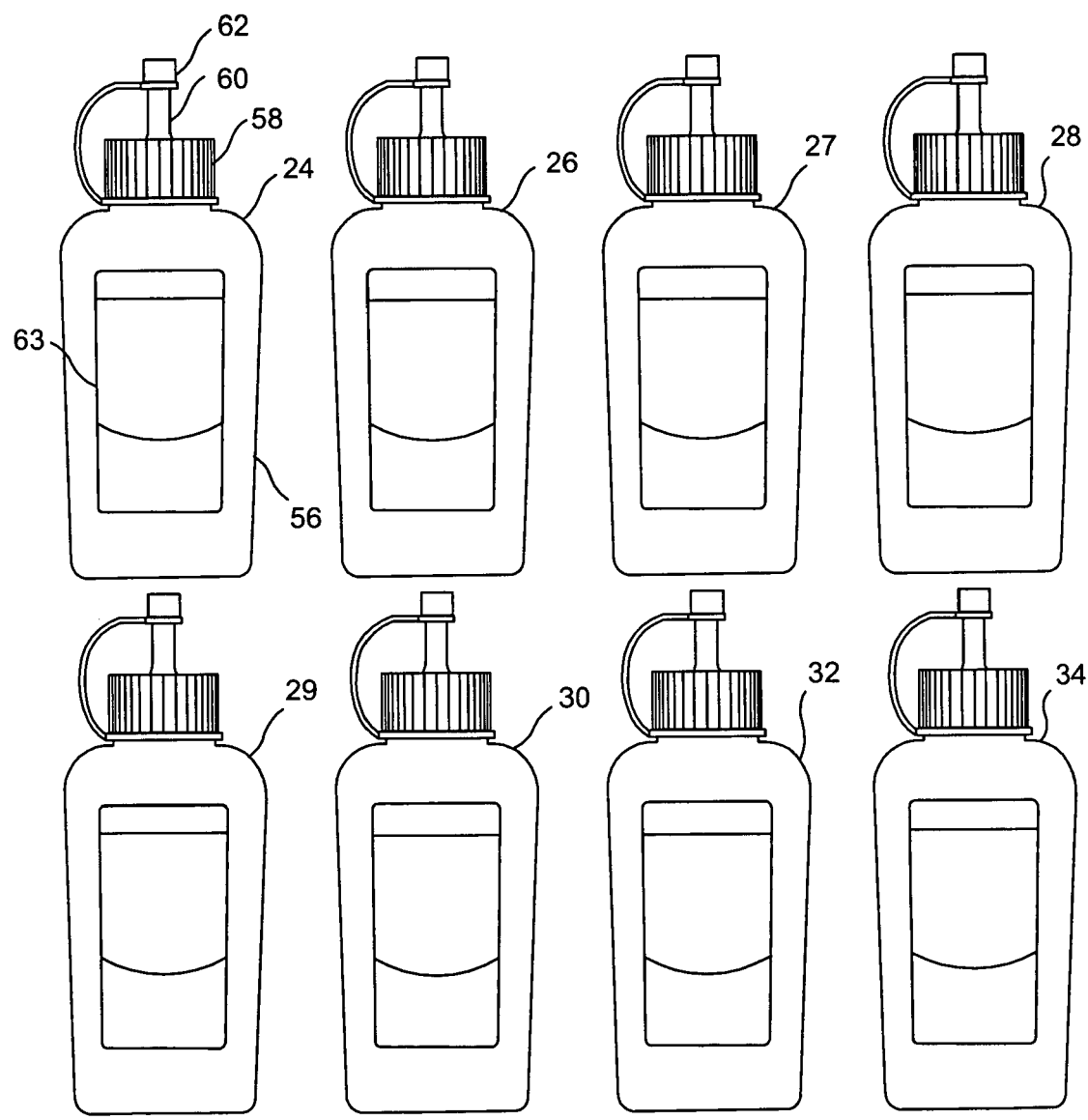
FIG. 3 is a schematic illustration of the eight containers of color tints incorporated in FIG. 1 removed from the carrying box.

FIG. 3 depicts an illustrative design for color tint containers 24, 26, 27, 28, 29, 30, 32 and 34. The color tint containers typically include different color tints across a wide array of the color spectrum. Moreover, the containers used in the preferred embodiment incorporate a bottle 56 and a screw-off cap 58. However, screw-off cap 58 is slightly more complex than screw-off cap 46 and screw-off cap 52 exemplarily utilized in connection with first color base paint container 20 and second base color paint container 22. Specifically, screw-off cap 58 includes a narrow nozzle 60 and a corresponding and removable cap 62. The more elaborate design allows better control for mixing of the color tints into the base color paint. As shown in FIG. 3, a label 63 is also provided on each color tint container that may incorporate marketing data, color information, and/or instructional data.

FIGS. 4-8 depict various views and elements of booklet 42. FIG. 4 is an illustration of booklet 42 in a closed position similar to a closed match book. The outer binding of booklet 42 can be made of a composite material (such as paper, cardboard, flexible plastic, etc.) having a reinforced engaging flap 64, a top edge 66, a right surface 68, a bottom edge, 70 and an insert flap 72. Insert flap 72 is shown in FIG. 4 as engaged within reinforced engaging flap 64. A plurality of coded sheets 74 are contained within booklet 42, yet are easily removable from booklet 42 by means of perforations (perforated edges) 76. Coded sheets are typically comprised of paper, but any suitable porous material to absorb paint can be used. In the preferred embodiment of the present invention, the inside of right surface 68 and the inside of insert flap 72 will incorporate removable self-adhesive stickers whose usefulness will be described below.

Figure 8:
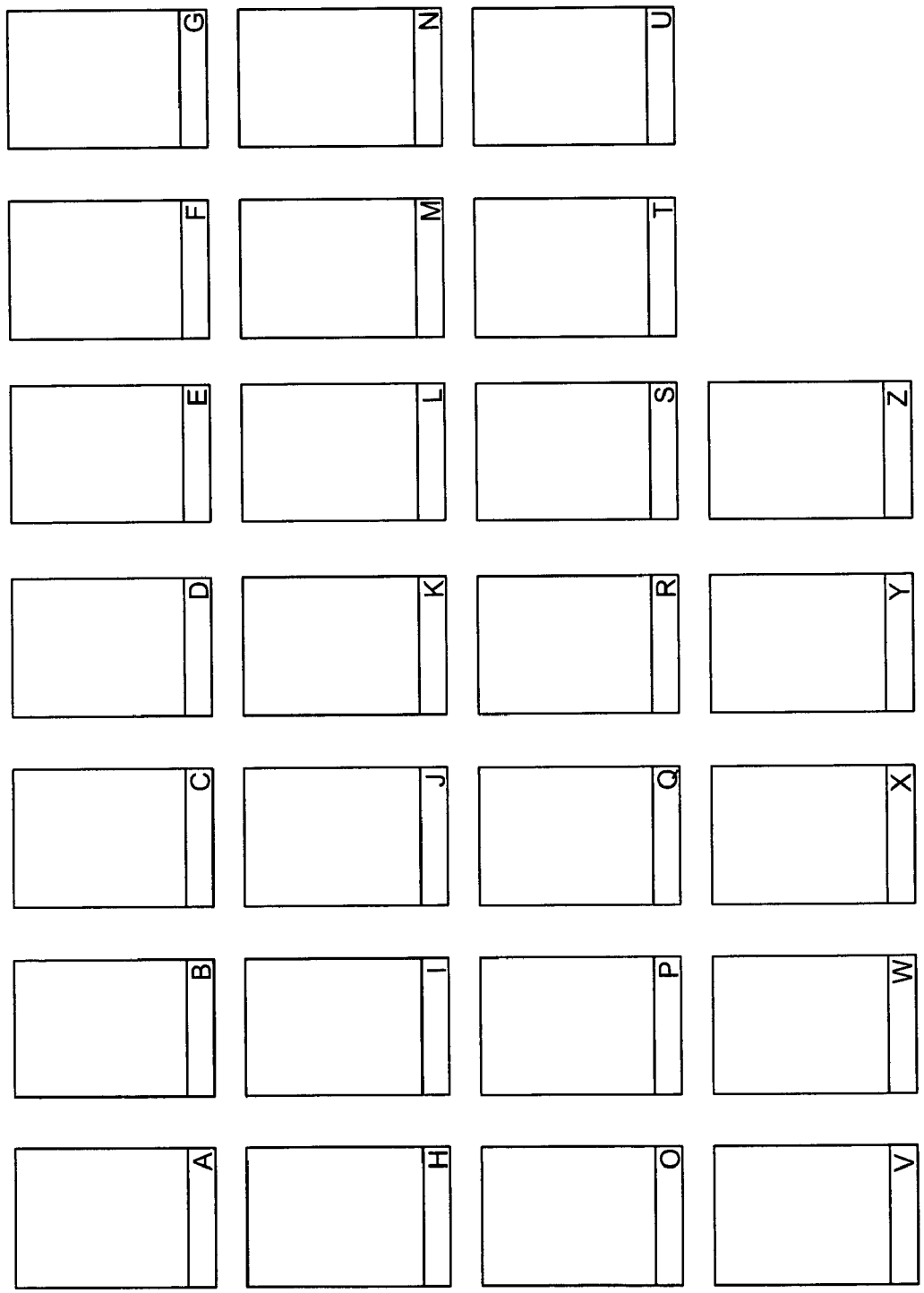
FIG. 8 is a schematic illustration of the separate coded sheets of the present invention removed from the matchbook styled booklet.
Figure 9:
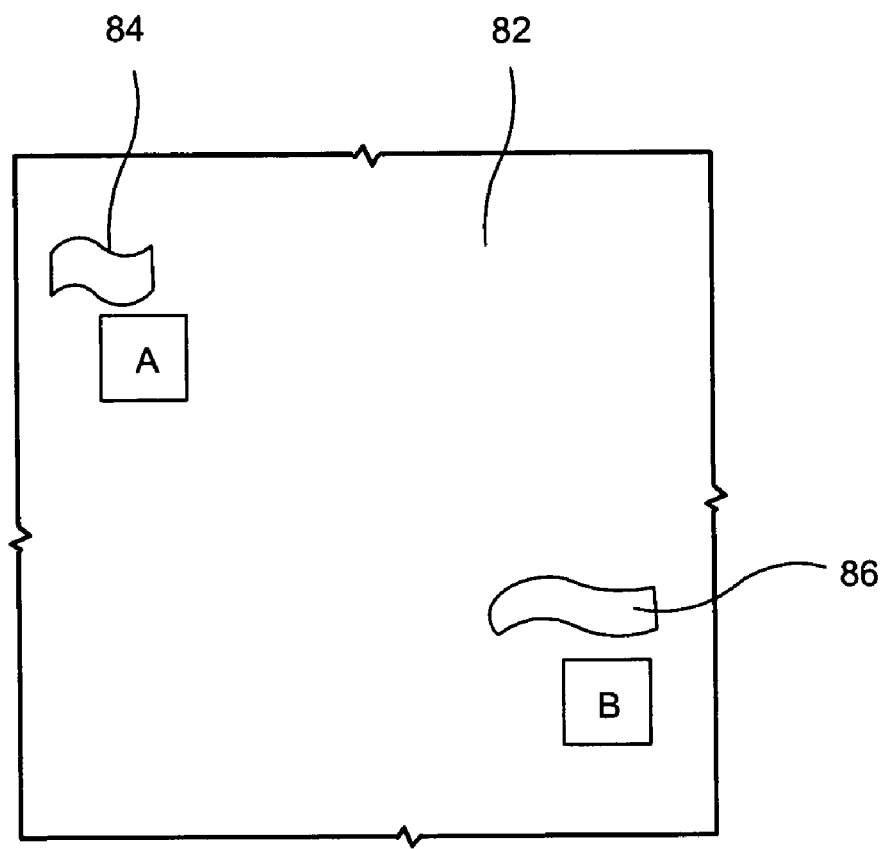
FIG. 9 is a schematic illustration of two portions of a wall surface and two coded sheets being painted and labeled in accordance with the method of the present invention.
Figure 9:
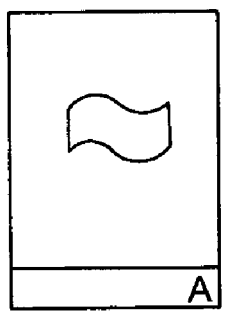
Figure 9:
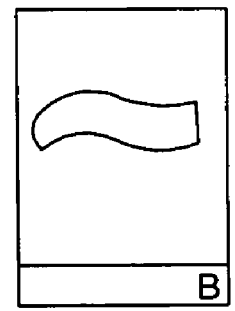

Turning to FIG. 5, booklet 42 is shown in a partially opened position. The inside of insert flap 72 is shown as having alphabetically coded and separately removable coded self-adhesive stickers 78 that are labeled "A-Z." Although, in FIG. 5, only the coded sheets 74 labeled "A" is clearly visible, in actuality, there are, in the presented embodiment, twenty-six alphabetically coded sheets overlaying each other. The separately labeled coded sheets are shown in FIG. 8. Each of the plurality of coded sheet 74 is removable from booklet 42 by means of perforations 76. FIG. 6 shows a back view of booklet 42 in a partially open position as shown in FIG. 5.

As a further enhancement of the usefulness of the system and method of the present invention, the inside portion of right surface 68 also includes selectively removable self-adhesive stickers 80 that are descriptive in nature. Although exemplary forms of descriptive self-adhesive stickers 80 are shown in FIG. 7, countless variations are possible. In fact, even blank self-adhesive stickers might be provided to allow a user to adopt customized descriptions. As shown in FIG. 7, self-adhesive stickers 80 suggest the person who likes or dislikes a particular color, whether a slightly lighter or darker tone is desired, and descriptions relating to the room upon which a color is to be utilized.

FIG. 8 will be used to describe how a user would utilize the system and method of the present invention. After opening kit 10, the user would place selected base color paints from either first base color paint container 20 or second base color paint container 22 into paint mixing container 38. Next, the user would incorporate one or more color tints from containers 24, 26, 27, 28, 29, 30, 32 and 34 into the paint mixing container 38. A user would then stir the contents of paint mixing container 38 with mixing stick 18. After visually determining that a resultant color could be desirable, the user would utilize paint brush 16 to paint a small (and typically hidden) portion 84 of wall 82 and also paint one of the plurality of coded sheets 74. If the user had painted the coded sheet 74 labeled "A," he would also remove the correspondingly coded self-adhesive sticker 78 that was labeled "A" and put it on wall 78 near painted portion 84. After the paint on painted portion 84 of wall 82 dried, if the user was satisfied with the resultant color, he could remove coded sheet 74 labeled "A" from booklet 42 and bring it to a retailer to manufacture sufficient quantities of paint to cover wall 82. However, if the user was not satisfied with the color or wished to create a second color to compare with painted portion 84, the process could be repeated such that the new color was created. The user would again create a painted portion 86, also paint a second coded sheet 74 labeled "B," and remove the similarly coded self-adhesive sticker 78 labeled "B" and place it next to painted portion 86. This process could be repeated until a desired result was achieved. By utilizing the method of the present invention, a minimal amount of wasted paint is incorporated, thus providing a significant environmental waste disposal advantage. In fact, even undesirable colors can be mixed with additional color tints to then achieve desirable results. An unlimited array of results is possible.

When working in multiple rooms, the user could use a single kit 10 to likewise create and select a desired color for each room to be painted. Moreover, as colors were tried, but rejected, the user could place self-adhesive stickers 80 on desired coded sheets 74 so that similar colors were not repeated and to keep track of prior results. Another significant advantage of utilizing coded sheets 74 is that the ultimately selected color can easily be maintained by storing the correct coded sheet. In this way, "color matching" at a later date is as simple as locating the properly coded sheet.

In the preferred embodiment of the present invention, base color paint container 20 contains a color known as basic snow whereas base color paint container 22 contains a color known as basic sand. Color tints containers 24, 26, 27, 28, 29, 30, 32, and 34 preferably contain colors known as cobalt, scarlet, butter, topaz, kale, clay, mocha, and ebony. From these base colors and tint colors, countless paint chip colors can be created. Additionally, the kit of the present invention can include pre-determined formulations to replicate certain popular colors.

It is deemed unnecessary to describe the specific chemical compositions of the base paint or the color tints since such information is readily known and available in the art. Moreover, various compositions can be incorporated depending on factors such as the surface to be painted, environmental conditions, etc. Similarly, the actual computer programs utilized to match and create the desired paint color is known in the art. These systems exist at multiple locations and are available from many vendors.

It will be apparent from the foregoing description that the present invention incorporates a valuable system and method of creating and selecting paint colors. However, many variations of the preferred embodiment are clearly envisioned. For instance, although the plurality of coded sheets and the correspondingly matched coded plurality of self-adhesive stickers have been incorporated into a single booklet, no such combination is required. For instance, individual sheets could be provided that have a particular code and a correspondingly coded selectively removable self-adhesive sticker directly on that sheet. Moreover, although described as contained in booklet form herein, and having perforations, coded sheets having attached gummed tabs (such as POST-IT® notes) can also be incorporated.

Although the described embodiment of the present invention has utilized alphabetically coded sheets and correspondingly alphabetically coded matched self-adhesive stickers, other possibilities exist. For instance, in order to actively engage a child in selecting his/her room color, correspondingly coded sheets and self-adhesive stickers can incorporate animals, symbols, colors, etc. It will also be noted that although an example of painting a wall has been described, the paint color selection system and method of the present invention can be utilized to select colors for any surfaces.

While there has been shown and described what is presently considered to be the preferred embodiment of this invention, it will be obvious that various changes and modifications may be made without departing from the broader aspects of this invention. It is, therefore, aimed in the appended claims to cover all such changes and modifications as fall within the true scope and spirit of the invention.

I claim:

1. A method of selecting a paint color for a surface utilizing a color tint, a base paint, and a plurality of coded sheets and a correspondingly matched coded plurality of self-adhesive stickers, said method comprising the steps of:

mixing said color tint into said base color paint to obtain a first resultant colored paint;

painting a first portion of said surface with said first resultant colored paint;

painting a first coded sheet with said first resultant colored paint;

placing the first coded self-adhesive sticker that corresponds to said first coded sheet near said first portion of said surface; and permitting said first portion of said surface and said first coded sheet to dry.

2. The method of claim 1 further comprising the step of:

inputting said first sheet into a computer color matching system to create additional quantities of paint to match said first resultant colored paint.

3. The method of claim 1 further comprising the steps of:

mixing said color tint into said base color paint to obtain a second resultant colored paint;

painting a second portion of said surface with said second resultant colored paint;

painting a second coded sheet with said second resultant colored paint;

placing a second coded self-adhesive sticker that corresponds to said second coded sheet near said second portion of said surface; and permitting said second portion of said surface and said second coded sheet to dry.

4. The method of claim 3 further comprising the steps of:

comparing said first resultant colored paint to said second resultant colored paint to determine a desired color; and inputting one of said first sheet and said second sheet into a computer color matching system to create additional quantities of paint having said desired color.

* * * * *